May 3, 1955   T. F. WORTH ET AL   2,707,756
END SHIELD CONSTRUCTION DYNAMOELECTRIC MACHINES
Filed Feb. 23, 1954

Inventors:
Thomas F. Worth,
Roger B. Kerr,
by Claude A. Mott
Their Attorney.

United States Patent Office 2,707,756
Patented May 3, 1955

2,707,756

END SHIELD CONSTRUCTION FOR DYNAMOELECTRIC MACHINES

Thomas F. Worth, Lynn, Mass., and Roger B. Kerr, Jamestown, R. I., assignors to General Electric Company, a corporation of New York Application February 23, 1954, Serial No. 411,711

2 Claims. (Cl. 310—254)

This invention relates to end shields for dynamoelectric machines and more particularly to end shields providing means for assisting in the hoisting and transporting of the machines.

It is customary in the manufacture of dynamoelectric machines of large frame size to provide means for assisting in the hoisting and transporting of a machine when it is being lifted or moved from place to place. This invention is concerned with end shields on which such means are provided in a simple, inexpensive manner.

Accordingly, it is an object of this invention to provide an improved end shield for a dynamoelectric machine providing means for assisting in the hoisting of the machine.

Another object of this invention is to provide an improved end shield which incorporates a common means for assisting in the removal of the end shield from the frame of a dynamoelectric machine and also for securing a hoisting sling on the machine.

Further objects and advantages of this invention will become apparent and this invention will be better understood by reference to the accompanying drawing and description, and the features of novelty which characterize this invention will be pointed out with particularity in the claims annexed to and forming part of this specification.

A feature of this invention is the provision of a cast end shield having a pair of radially extending, integrally cast projections on the outer periphery of the sides of the end shield which serve as knock-off lugs for removing the end shields from the stator frame and also serve to secure a sling-hoist against slipping off the ends of the end shields during the lifting of the machine. This is accomplished by placing the lugs approximately 180° from each other and locating them on the sides of the end shield in a horizontal plane through the machine. In practicing this invention in its broader aspects, it will occur to those skilled in the art that the lugs will serve to block the sling against slipping over the ends of the machine where the lugs are positioned at points at which the sling is tangential with the outer periphery of the end shield.

Figure 1:
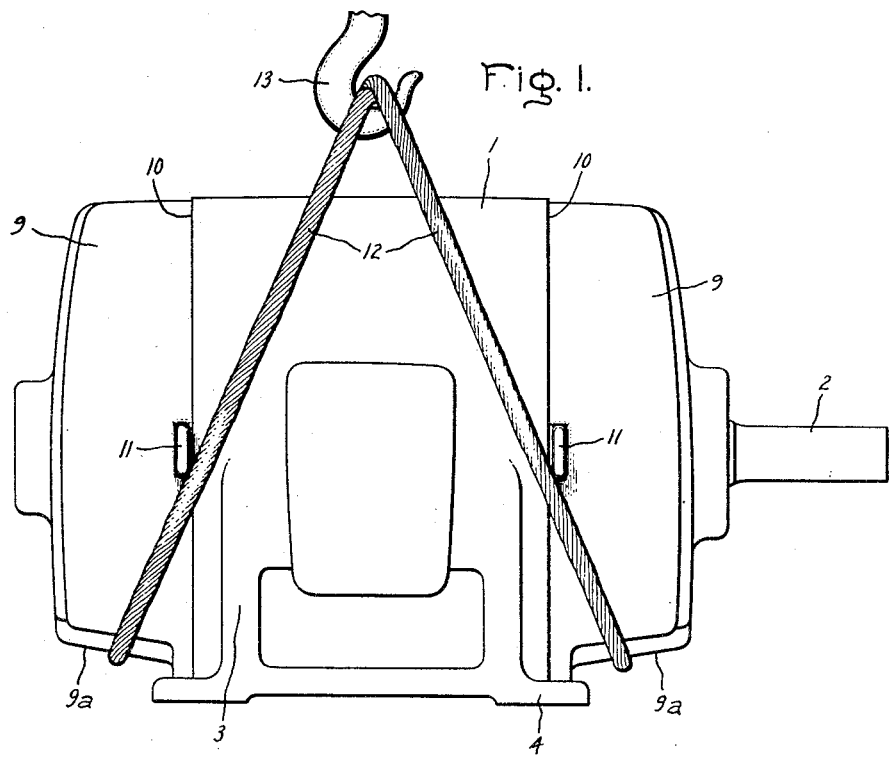

In the drawing, Fig. 1 is a side elevational view illustrating the improved end shield of this invention assembled on a dynamoelectric machine.

Figure 2:
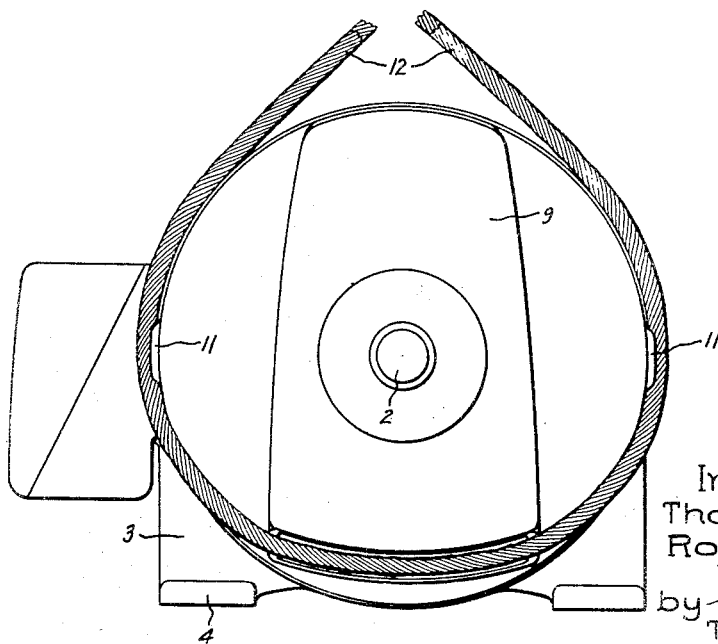

Fig. 2 is an end view of the machine of Fig. 1.

Turning now to the drawing, there is shown a dynamoelectric machine having a stator shell member 1 and a rotor member provided with a shaft 2 which is rotatably mounted in suitable bearings (not shown) in end shields 9 of the machine. Integrally cast with the stator shell member 1 is a supporting base 3 providing a plurality of feet 4. In order to provide the maximum stability of the support, the supporting base joins the shell member 1 substantially at the ends thereof adjacent the machined end at 10 which abuts the end shields 9.

The end shields 9 are preferably cast of a suitable material such as cast iron, and are secured to the stator member 1 at 10 by a conventional continuous rabbet with a close fit in which the dimensional requirements are represented by tolerances in the order of plus .002" minus .000". Since a pair of parts joined by a fit of this tolerance require a considerable force for disassembly, there must be provided some means to apply such a force for removing the end shields 9 from the stator shell member 1 in the event it becomes necessary to do so for maintenance or inspection.

Such a means is provided in the illustrated embodiment of this invention in the form of a pair of radially projecting knock-off lugs 11 integrally cast on the end shield 9 on the opposite sides thereof. By positioning these knock-off lugs in diametrically opposed positions in a plane through the center of the end shield, a pair of lugs provides the necessary means for the application of force during the removal of the end shields 9 and to correct any misalignment of the end shields with the stator frame 1 at that time.

The end shield of this invention contemplates the use of a continuous rope-sling 12 passed over the ends of the machine and engaged by hook 13 of a hoist (not shown) for lifting and transporting the machine. This means of cradling a machine results in a very secure engagement with the machine and may be used without a special design of the machine or the provision of lifting rings or eye bolts. However, since the end shields 9 are tapered in an axial direction as indicated at 9a, the sling will tend to slide off the ends of the motor unless means are provided for preventing such slippage. This is especially true where the hoisting sling is appreciably longer than required to twice encircle the machine, as will occur where a single hoist is used to lift machines of various frame sizes. Referring particularly to Fig. 1, it will be observed that by placing the knock-off lugs 11 adjacent the rabbeted connections 10 on the sides of the end shield 9 in a horizontal plane through the machine, they will engage the sling positioned around the ends of the machine. The position of the lugs may be varied so long as they are so constructed and arranged that they engage the sling where the sling is tangential to the periphery of the machine. Moreover, as hereinbefore explained, by placing these lugs in a plane through the center of the end shield, they will serve as means for the application of force in the removal of the end shields.

It will now be readily apparent that the improved construction of this invention provides an end shield wherein a single pair of radially extending lugs on the sides of the end shield serve to secure a sling on the machine during hoisting, and also will serve to aid in the removal of the end shields from the stator frame.

While there is illustrated and described a particular embodiment of this invention, further modifications and improvements will occur to those skilled in the art. It is to be understood, therefore, that this invention is not to be limited to the specific embodiment shown, and it is intended in the appended claims to cover all modifications thereof which do not depart from the spirit and scope of this invention.

We claim:

1. A dynamoelectric machine adapted to be hoisted by a sling cradled around the ends thereof having an outer cylindrical shell member terminating in a pair of annular openings, supporting feet connected to said shell member substantially at the ends thereof precluding the sling from encircling said cylindrical shell member, and a pair of end shields having a maximum diameter no greater than the outer diameter of said cylindrical shell member and provided with a rabbeted connection with said shell member, each of said end shields having an outer surface tapered in the axial direction to provide a smaller diameter at its free end and having a pair of radially projecting lugs on the tapered surface adjacent the rabbeted connection, said lugs being located on a horizontal line through the center of said end shields to prevent the sling from slipping over the ends of said end shields and to provide means for assisting in the removal of said end shields from said shell member.

2. A dynamoelectric machine adapted to be hoisted by a sling cradled around the ends thereof having an outer cylindrical shell member terminating in a pair of annular openings, supporting feet connected to said shell member substantially at the ends thereof preventing the sling from encircling said cylindrical shell member, and a pair of end shields having a maximum diameter no greater than the outer diameter of said cylindrical shell member and provided with a rabbeted connection with said shell member, each of said end shields having an outer surface tapered in the axial direction to provide a smaller diameter at its free end and having a pair of radially projecting lugs on the tapered surface adjacent the rabbeted connection, said lugs being located in diametrically opposed positions on a line through the center of said end shields and adapted to engage the sling at a point where the sling is tangential to the periphery of the machine to block said sling from slipping off the ends of the machine and to provide precisely located means for the application of force in the removal of said end shields from said member.

References Cited in the file of this patent

UNITED STATES PATENTS

| | | |
|---|---|---|
| 695,163 | Lundell | Mar. 11, 1902 |
| 1,629,876 | Lincoln | May 24, 1927 |

FOREIGN PATENTS

| | | |
|---|---|---|
| 124,179 | Austria | Aug. 25, 1931 |